(12) United States Patent
Longaker et al.

(10) Patent No.: US 6,271,788 B1
(45) Date of Patent: *Aug. 7, 2001

(54) NETWORK OF EQUIVALENT GROUND TRANSMITTERS

(75) Inventors: Harold Lewis Longaker, Houston, TX (US); Leonid Sheynblat, Belmont, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/888,737

(22) Filed: Jul. 7, 1997

Related U.S. Application Data (63) Continuation of application No. 08/650,731, filed on May 20, 1996, now Pat. No. 5,646,630.

(51) Int. Cl.[7] ............................... H04B 7/185; G01S 5/02

(52) U.S. Cl. ...................... 342/357.03; 342/357.09; 342/457; 342/464; 342/357.14; 701/215

(58) Field of Search .................................. 342/357, 457, 342/464, 357.03, 357.09, 357.14; 701/215

(56) References Cited

U.S. PATENT DOCUMENTS

| | | | |
|---|---|---|---|
| 5,422,813 | * | 6/1995 | Schuchman et al. ............... 342/357 |
| 5,708,440 | * | 1/1998 | Trimble et al. ..................... 342/357 |
| 5,711,388 | * | 1/1998 | Davies et al. ...................... 180/168 |

* cited by examiner

Primary Examiner—Theodore M. Blum
(74) Attorney, Agent, or Firm—Blakely, Sokoloff, Taylo & Zafman LLP (57) ABSTRACT

A system for differential navigation of an autonomous vehicle in the location with the limited visibility of the sky is disclosed. The system employs a plurality of satellites, a plurality of ground transmitters, and a base station. Different configurations for the minimum number of the satellites and the minimum number of ground transmitters are disclosed.

27 Claims, 3 Drawing Sheets

NETWORK OF EQUIVALENT GROUND TRANSMITTERS

This is a continuation application of application Ser. No. 08/650,731, filed May 20, 1996, now U.S. Pat. No. 5,646,630.

BACKGROUND

The Global Positioning System (GPS) is a widely used satellite-based navigation system consisting of a network of satellites broadcasting pseudo-random noise (PRN) codes modulated on an L-band carrier (L1, L2). A GPS receiver uses measurements of the pseudo-random (PRN) code-phase and carrier-phase from four or more satellites to solve for the three-dimensional position of the receiver and to calibrate its internal time reference. The GPS receiver determines velocity from measurements of the carrier phase and doppler. Accuracy of the GPS solution is limited by the errors on the GPS signals and the geometry established by the positions of the satellites relative to the user.

For instance, there are areas of limited visibility of the sky where the user can observe and receive the satellite signals from only a limited number of the Satellite Positioning System (SATPS) satellites. Thus, in such an area it is impossible for the user to precisely solve for the three-dimensional position of its receiver, to calibrate its internal time reference, or to determine its velocity.

What is needed is a system of networked ground transmitters (GT) located in the well-known positions that together with the visible SATPS satellites and together with the base station positioned in the precisely known location allows the user to precisely determine its position location, its timing, and its velocity.

SUMMARY

The present invention is unique because it discloses a system of networked equivalent ground transmitters (GT) located in the well-known positions that together with the visible SATPS satellites and together with the base station allows one to precisely determine the position location, timing, and velocity of an autonomous vehicle.

The first aspect of the present invention is directed to a system (A) for accurate determination of the terrestrial position, timing coordinate, and velocity of an autonomous vehicle in real-time by transmitting signals from well-known locations.

The system (A) comprises: (1) a K-number of $SATPS_j$ satellites, K being an integer, j being an integer less than or equal to K, for generating satellite signals $L(SATPS_j)$; (2) an N-number of ground transmitters ($GT_i$), N being an integer, i being an integer less or equal to N, for generating $L(GT_i)$ signals for providing ranging, timing, and velocity information at the user's location; (3) a base station (BS) for receiving the $L(SATPS_j)$ signals from each $SATPS_j$ satellite, for receiving the $L(GT_i)$ signals from each $GT_i$, for calculating the differential correction data signal L(BS), and for transmitting the differential correction data signal L(BS) to the user's location; (4) a 2N-number of ground transmitter communication links $CLGT_i$ between each $GT_i$ and the user, and between each $GT_i$ and the base station (BS); and (5) a communication link CLB between the base station and the user. The user receives the $L(SATPS_j)$ signals from each satellite $SATPS_j$, the $L(GT_i)$ signals from each $GT_i$, and the differential correction data signal L(BS) from the base station. It is assumed, that the location coordinates of each $GT_i$ and the base station are precisely known. It is also assumed that each satellite $SATPS_j$ includes a satellite clock with a known clock bias $CB_{SATPSj}$ and a known clock drift $CD_{SATPSj}$, each $GT_i$ includes a $GT_i$ clock with an unknown clock bias $CB_{GTi}$ and an unknown clock drift $CD_{GTi}$, and the base station includes a base station clock with an unknown clock bias $CB_{BS}$ and an unknown clock drift $CD_{BS}$.

In one preferred embodiment of system (A), the K-number of $SATPS_j$ satellites comprises at least one satellite, and the N-number of ground transmitters ($GT_i$) comprises at least three $GT_i$. In another preferred embodiment, the K-number of $SATPS_j$ satellites comprises at least two satellites, and the N-number of ground transmitters ($GT_i$) comprises at least two $GT_i$. Yet, in one more preferred embodiment, the K-number of $SATPS_j$ satellites comprises at least three satellites, and the N-number of ground transmitters ($GT_i$) comprises at least one $GT_i$. In each of these embodiments, the user utilizes the satellite signals $L(SATPS_j)$ generated by each $SATPS_j$, the $L(GT_i)$ signals generated by each $GT_i$, and the differential correction data signal L(BS) generated by the base station (BS) in order to determine in real-time the user's position fixes, the user's timing coordinate, and the user's velocity.

Another aspect of the present invention is directed to a system (B) comprising: (1) an N-number of ground transmitters ($GT_i$), wherein each $GT_i$ generates its own $L(GT_i)$ signal for providing ranging, timing, and velocity information at the user's location; (2) a base station (BS) for receiving the $L(GT_i)$ signals from each $GT_i$, for calculating the differential correction data signal L(BS), and for transmitting the differential correction data signal L(BS) to the user's location; (3) a 2N-number of ground transmitter communication links $CLGT_i$ between each $GT_i$ and the user, and between each $GT_i$ and the base station (BS); and (4) a communication link CLB between the base station and the user. The user receives the $L(GT_i)$ signals from each $GT_i$, and the differential correction data signal L(BS) from the base station. The location coordinates of each $GT_i$ and the base station are precisely known. Each $GT_i$ includes a $GT_i$ clock with an unknown clock bias $CB_{GTi}$ and an unknown clock drift $CD_{GTi}$; and the base station includes a base station clock with an unknown clock bias $CB_{BS}$ and an unknown clock drift $CD_{BS}$.

In one preferred embodiment of system (B), the N-number of ground transmitters ($GT_i$) comprises at least four $GT_i$, and the user utilizes the $L(GT_i)$ signals generated by each $GT_i$ and the differential correction data signal L(BS) generated by the base station (BS) in order to determine in real-time the user's position fixes, the user's timing coordinate, and the user's velocity.

In another preferred embodiment of system (B), the N-number of ground transmitters ($GT_i$) comprises at least one $GT_i$, and the user utilizes the $L(GT_i)$ signals generated by each $GT_i$ and the differential correction data signal L(BS) generated by the base station (BS) in order to determine in real-time the user's timing coordinate.

The communication link CLB in both systems (A) and (B) can include a variety of embodiments. It can include a radiowave frequency band, an infrared frequency band, a microwave frequency band, or the ISM (industrial scientific medical) unlicensed operation band. The ISM band range can be selected from a class of frequency range consisting of 900 MHz, 2.4 GHz, and 5.8 GHz; wherein the user can own both ends of the ISM communication system. The communication link CLB can also include: a real time circuit switched communication link, a 1.8 GHz frequency band, wherein the 1.8 GHz band supports the personal communications services (PCS); a system of Low Earth Orbiting Satellites (LEOS), wherein the LEOS is used to store and to forward digital packet data. The communication link CLB can be selected from a class of radiowave communication links consisting of a cellular telephone communication means, paging signal receiving means, wireless messaging services, wireless application services, a wireless WAN/LAN station, and an Earth-satellite-Earth communication module that uses at least one satellite to relay a radiowave signal. The communication link CLB can also include an Advanced Mobile Phone System (AMPS) including a modem, wherein the modem is selected from a class consisting of a DSP (digital signal processor) modem, and a cellular digital packet data (CDPD) modem. It can include a digital cellular telephone communication means, wherein the digital cellular telephone communication means includes a means of modulation of digital data over a radiolink selected from a class consisting of a time division multiple access (TDMA) system, and a code division multiple access (CDMA) system.

The communication link CLGT in both systems (A) and (B) can also include a variety of embodiments including a radiowave frequency band, an infrared frequency band, a microwave frequency band, and all other embodiments that were discussed in connection with the communication link CLB.

In the preferred embodiment of both systems (A) and (B), at least one GT comprises a pseudolite, and at least one communication link CLGT comprises a pseudo-GPS communication link, and at least one GT transmits pseudo-GPS signals on the L-band frequency.

Yet another aspect of the present invention is directed to a method for accurate determination of the terrestrial position, timing coordinate, and velocity of an autonomous vehicle in real-time by transmitting signals from well-known locations. The method employing the system (A) comprises the steps of: (a) providing a K-number of SATPS$_j$ satellites; (b) generating satellite signals L(SATPS$_j$) by each SATPS$_j$ satellite for providing ranging, timing, and velocity information at the user's location; (c) providing an N-number of ground transmitters; (d) generating ground transmitter L(GT$_i$) signals by each GT$_i$ for providing ranging, timing, and velocity information at the user's location; (e) providing a base station (BS); (f) receiving the L(SATPS$_j$) signals from each SATPS$_j$ satellite by the base station (BS); (g) receiving the L(GT$_i$) signals from each GT$_i$ by the base station (BS); (h) calculating the differential correction data signal L(BS) by the base station (BS); (i) transmitting the differential correction data signal L(BS) to the user's location by the base station (BS); (k) receiving the satellite L(SATPS$_j$) signals from each satellite SATPS$_j$ by the user; (l) receiving the L(GT$_i$) signals from each GT$_i$ by the user; (m) receiving the differential correction data signal L(BS) from the base station by the user; and (n) accurately determining the terrestrial position, timing coordinate, and velocity of the autonomous vehicle by the user. The method utilizing the system (A) can also include the steps of synchronization and initialization of each ground transmitter GT$_i$.

Yet another additional aspect of the present invention is directed to a method for accurate determination of the terrestrial position, timing coordinate, and velocity of an autonomous vehicle in real-time by transmitting signals from well-known locations employing the system (B). The method comprises the steps of: (a) providing an N-number of ground transmitters; (b) generating ground transmitter L(GT$_i$) signals by each GT$_i$ for providing ranging, timing, and velocity information at the user's location; (c) providing a base station (BS); (d) receiving the L(GT$_i$) signals from each GT$_i$ by the base station (BS); (e) calculating the differential correction data signal L(BS) by the base station (BS); (f) transmitting the differential correction data signal L(BS) to the user's location by the base station (BS); (g) receiving the L(GT$_i$) signals from each GT$_i$ by the user; (h) receiving the differential correction data signal L(BS) from the base station by the user; and (i) accurately determining the terrestrial position, timing coordinate, and velocity of the autonomous vehicle by the user. The method employing the system (B) can also include the steps of synchronization and initialization of each ground transmitter GT$_i$.

FULL DESCRIPTION OF THE PREFERRED EMBODIMENT

Figure 1:
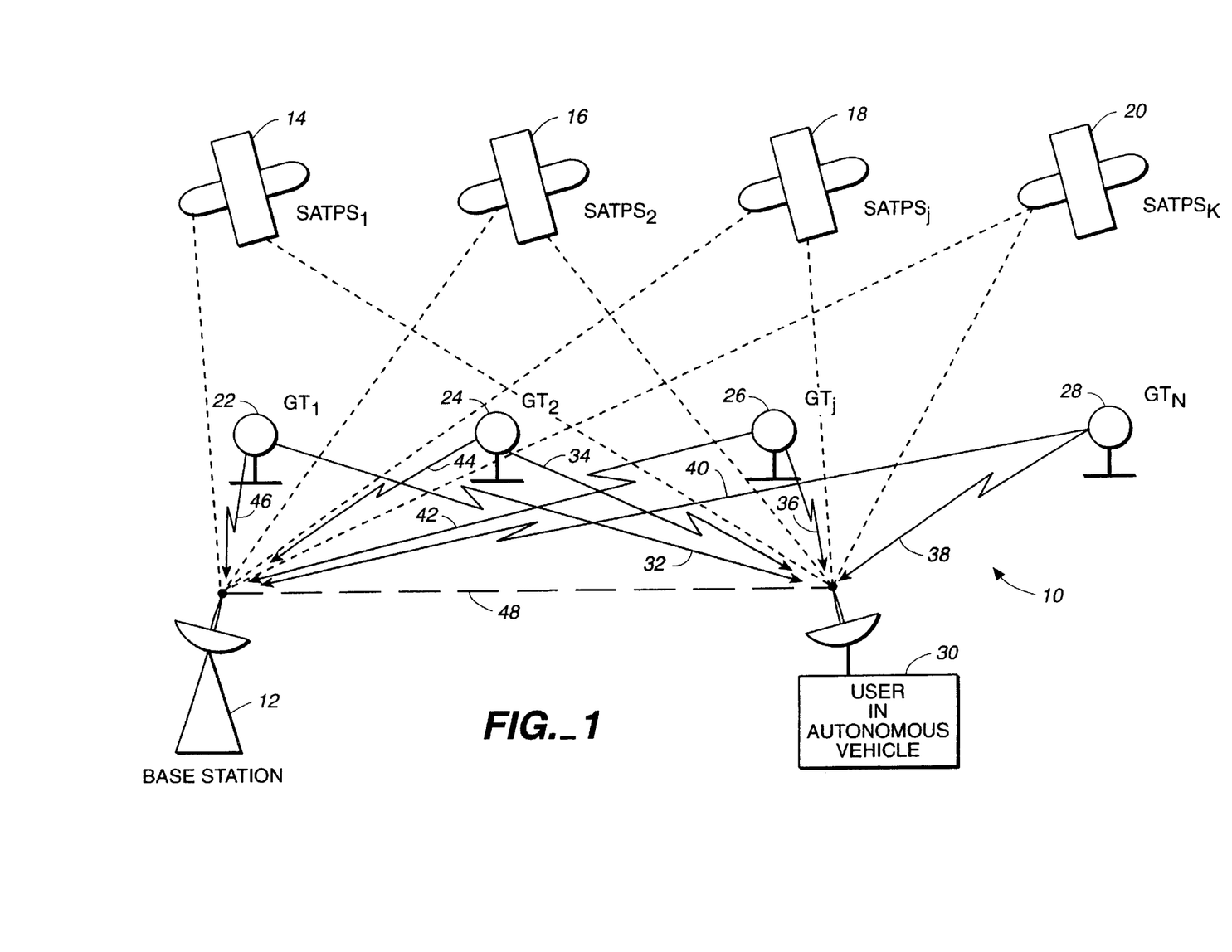
FIG. 1 illustrates a system (A) comprising K-number of satellites (SATPS$_j$), N-number of ground transmitters (GT$_i$), and a base station (BS).

FIG. 1 illustrates a system A (10) comprising a K-number of satellites (SATPS$_j$) (14, 16, 18, 20), an N-number of ground transmitters (GT$_i$) (22, 24, 26, 28), a base station (BS) (12), a 2N number of GTCL communication links between each GT$_i$ and base station (40, 42, 44, 46) and between each ground transmitter GT$_i$ and the user (32, 34, 36, 38), and a communication link CLB (48) between the base station and the user's receiver placed in an autonomous vehicle (30).

The autonomous vehicle (30) has the limited visibility of the sky. The satellites 14, 16, 18, and 20 provide the satellite signals which are received by the base station (BS) 12 and by the user's receiver. In the disclosed embodiment the ground transmitters (GT) do not include the receiving antennas and do not have the satellite tracking capabilities. Thus, the GT does not suffer from the "near-far" problem, because there is no interference between the receiving and the transmitting antennas.

The first element of the present embodiment is the GPS, that is a system of satellite signal transmitters, with user's receivers located on the Earth's surface or adjacent to the Earth's surface, that transmits information from which an observer's present location, velocity, and/or the time of observation can be determined. There is also the Global Orbiting Navigational Satellite System (GLONASS), which can operate as an alternative or an additional GPS system.

The Global Positioning System (GPS) is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, four or more GPS satellites will be visible from most points on the Earth's surface, and radio access to four or more such satellites can be used to determine an observer's position anywhere on the Earth's surface, 24 hours per day. Each satellite carries a satellite clock including a cesium or rubidium atomic clock to provide timing information for the signals transmitted by the satellite. Each satellite clock includes a known clock bias $CB_{SATPSj}$ and a known clock drift $CD_{SATPSj}$, because clock corrections are provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiplies f1=154 f0 and f2=120 f0 of a base frequency f0=10.23 MHz. The L1 signal from each satellite is a binary phase shift key (BPSK) modulated by two pseudorandom noise (PRN) codes in phase quadrature, designated as the C/A-code and P(Y)-code. The L2 signal from each satellite is presently BPSK modulated by only the P(Y)-code. The nature of these PRN codes is described below.

One motivation for use of two carrier signals L1 and L2 is to allow partial compensation for propagation delay of such a signal through the ionosphere, wherein delay varies approximately as the inverse square of signal frequency f (delay~$f^2$). This phenomenon is discussed by MacDoran in U.S. Pat. No. 4,463,357, which discussion is incorporated by reference herein.

A signal transmitted by a particular GPS satellite is tracked by generating and matching, or correlating, the PRN code for that particular satellite. All PRN codes are known and are generated or stored in GPS receivers used by ground observers. A first PRN code for each GPS satellite, sometimes referred to as a precision code or P(Y)-code, is a relatively long, fine-grained code having an associated clock or chip rate of f0=10.23 MHz. A second PRN code for each GPS satellite, sometimes referred to as a clear/acquisition code or C/A-code, is intended to facilitate rapid satellite signal acquisition and hand-over to the P(Y)code, and is a relatively short, coarser-grained code having a clock or chip rate of f0/10=1.023 MHz. The C/A-code for any GPS satellite has a length of 1023 chips or time increments before this code repeats. The full P(Y)-code has a length of 259 days, with each satellite transmitting a unique portion of the full P(Y)-code. The portion of P(Y)-code used for a given GPS satellite has a length of precisely one week (7.000 days) before this code portion repeats. Accepted methods for generating the C/A-code and P(Y)-code are set forth in the GPS Interface Control Document ICD-GPS-200, published by Rockwell International Corporation, Satellite Systems Division, Revision B-PR, Jul. 3, 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System,* Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHz, where k (=0,1,2, . . . 23) is the satellite slot number. These frequencies lie in two bands at 1.597–1.617 GHz (L1) and 1,240–1,260 GHz (L2). The L1 code is BPSK modulated by a C/A-code (chip rate=0.511 MHz) and by a P(Y)-code (chip rate=5.11 MHz). The L2 code is presently BPSK modulated only by the P(Y)-code. The GLONASS satellites also transmit navigational data at a rate of 50 Baud. Because the GLONASS system has chosen the FDMA approach, there is no need for multiple P(Y) or C/A codes for different GLONASS satellites. The methods for receiving, processing, and utilizing the GLONASS signals are similar to the methods used for the GPS signals.

Reference to a Satellite Positioning System or SATPS herein refers to a Global Positioning System (GPS), to a Global Orbiting Navigation Satellite System (GLONASS), and to any other compatible satellite-based system that provides information by which an observer's position, velocity, and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-Centered-Earth-Fixed (ECEF) coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS signals that compromise the accuracy of absolute position determination are similar in magnitude for stations that are physically close. The effect of these errors on the accuracy of differential position determination is therefore substantially reduced by a process of partial error cancellation.

In the disclosed embodiment of the invention the user 30 has a SATPS receiver including a SATPS antenna. The SATPS antenna receives SATPS signals from a visible plurality of SATPS satellites. The visible plurality of SATPS can include from zero SATPS and up to four or more SATPS satellites depending on the particular environment where the user sitting in the autonomous vehicle is located. The antenna passes these signals to an SATPS signal receiver/processor, which (1) identifies the SATPS satellite source for each SATPS signal, (2) determines the travel time taken for each identified SATPS signal to arrive at the antenna, and (3)

determines the present location of the SATPS antenna from this information and from the ephemeris information for each identified SATPS satellite. The SATPS signal antenna and signal receiver/processor are part of the user segment of a particular SATPS, the Global Positioning System, as discussed by Tom Logsdon, op cit, p 33–90.

Each SATPS receiver includes two different types of tracking loops. The code-tracking loop tracks the C/A-code and/or P(Y)-code pulse trains to obtain the signal travel time for each relevant satellite. The phase-lock loop tracks the satellite's carrier wave to obtain its carrier phase. Code-tracking allows the receiver to measure the appropriate pseudo-ranges. Carrier phase tracking allows the receiver to measure the corresponding instantaneous carrier phase.

The navigation processor uses the pseudo-range, the carrier phase, and doppler measurements to determine the instantaneous position coordinates and the instantaneous velocity components of the GPS receiver.

The second element of the system (A) is a base station (BS) 12 (see FIG. 1). The base station is an indispensable part of the differential navigation system. In order to encourage widespread adoption of differential navigation, the Radio Technical Commission for Maritime Services established the Special Committee 104 (SC-104) in November 1983 to develop recommendations on standards for the broadcast of differential corrections to users of the GPS and to define the communication link CLB (see 48 in FIG. 1) between the reference station (base station) and the users.

The conventional form of differential GPS consists of s fixed base station placed at a known location which determines the range and range-rate measurement errors in each received GPS signal and communicates these as corrections to be applied by local users. The base station (BS) 12 has its own imprecise clock with the clock bias $CB_{BASE}$. As a result, the local users are able to obtain more accurate navigation results relative to the base station location and the base station clock. With proper equipment, a relative accuracy of 5 meters should be possible at distances of a few hundred kilometers from the base station. In addition to better navigational accuracy, differential GPS also improves navigational reliability by assuring the user that the GPS signals are being checked and eliminated if necessary.

Special Committee 104 has released special data exchange protocols and message formats for the differential corrections. In particular, the SC-104 recommendations call for a 100-bit-per-second data stream using phase-shift-key (PSK) modulation to mark the boundaries between binary 0s and 1s. The differential corrections employ a fixed word length but variable word count format, and the parity checking schemes.

The communication link CLB (48) can be implemented using a variety of different embodiments in order to transmit the differential corrections to the user.

In general, the communication link CLB can employ a radiowave frequency band, an infrared frequency band, or a microwave frequency band.

In one embodiment, the communication link CLB can include the ISM (industrial scientific medical) unlicensed operation band, including 900 MHz, 2.4 GHz, or 5.8 GHz bands, wherein the user can own both ends of the ISM communication system. The ISM technologies are manufactured by Trimble Navigation Limited, Sunnyvale, Calif., Metricom, Los Gatos, Calif., and by Utilicom, Santa Barbara, Calif.

In another embodiment, the communication link can employ a 1.8 GHz band that supports the personal communications services (PCS). The PCS uses the international standard DCS-1800. In yet one more embodiment, the communication link can include a real time circuit switched communication link. For instance, the communication link employing a real time circuit switched communication link can include the Iridium satellite system produced by Motorola, Schaumburg, Ill. In one additional embodiment, the communication link can employ a system of Low Earth Orbiting Satellites (LEOS), a system of Medium Earth Orbiting Satellites (MEOS), or a system of Geostationary Earth Orbiting Satellites (GEOS) which can be used to store and to forward digital packet data. For instance, the LEOS systems in (20–30) GHz range are manufactured by Cellular Communications located in Redmond, Wash., and the LEOS systems in (1.6–2.5) GHz range are produced by Loral/Qualcomm located in San Diego, Calif.

The communication link CLB can also include a cellular telephone communication means, a paging signal receiving means, wireless messaging services, wireless application services, a wireless WAN/LAN station, or an Earth-satellite-Earth communication module that uses at least one satellite to relay a radiowave signal.

In another embodiment, the communication link CLB includes the cellular telephone communication means that can include an Advanced Mobile Phone System (AMPS) with a modem. The modem can comprise a DSP (digital signal processor) modem in 800 MHz range, or a cellular digital packet data (CDPD) modem in 800 MHz range. The cellular digital communication means includes a means of modulation of digital data over a radiolink using a time division multiple access (TDMA) system employing format IS-54, a code division multiple access (CDMA) system employing format IS-95, or a frequency division multiple access (FDMA). The TDMA system used in Europe is called groupe special mobile (GSM) in French.

The next element of the system (A) includes a plurality of ground transmitters ($GT_i$). The ground transmitters can include any device capable of generating $L(GT_i)$ signals for providing ranging, timing, and velocity information at the user's location.

Each ground transmitter $GT_i$ has an imprecise clock with the clock bias $CB_{GTi}$. In one embodiment, the synchronization signal (in the pseudolite embodiment signal 102 of FIG. 3) is used to synchronize the pseudolite clocks for all ground transmitters. This synchronization signal can be supplied by the base station (BS) using the communication link CLB (48 of FIG. 1).

It is assumed that each ground transmitter $GT_i$ precisely knows its position location. Thus, each ground transmitter has to be surveyed in order to determine its precise location. The initialization signal (that can be supplied by the base station) can provide the necessary location information to each ground transmitter (in the pseudolite embodiment signal 122 of FIG. 3).

Each ground transmitter uses a communication link CLGT (32, 34, 36, 38) for transmitting the $L(GT_i)$ signals to the user (30). The communication link CLGT can be implemented using a variety of different embodiments.

In general, the communication link CLGT can employ the same embodiments as the communication link CLB fully discussed above. For instance, the communication link CLGT can employ a radiowave frequency band, an infrared frequency band, a microwave frequency band, the ISM (industrial scientific medical) unlicensed operation band, including 900 MHz, 2.4 GHz, or 5.8 GHz bands, wherein the user can own the both ends of the ISM communication system, and so on.

Figure 3:
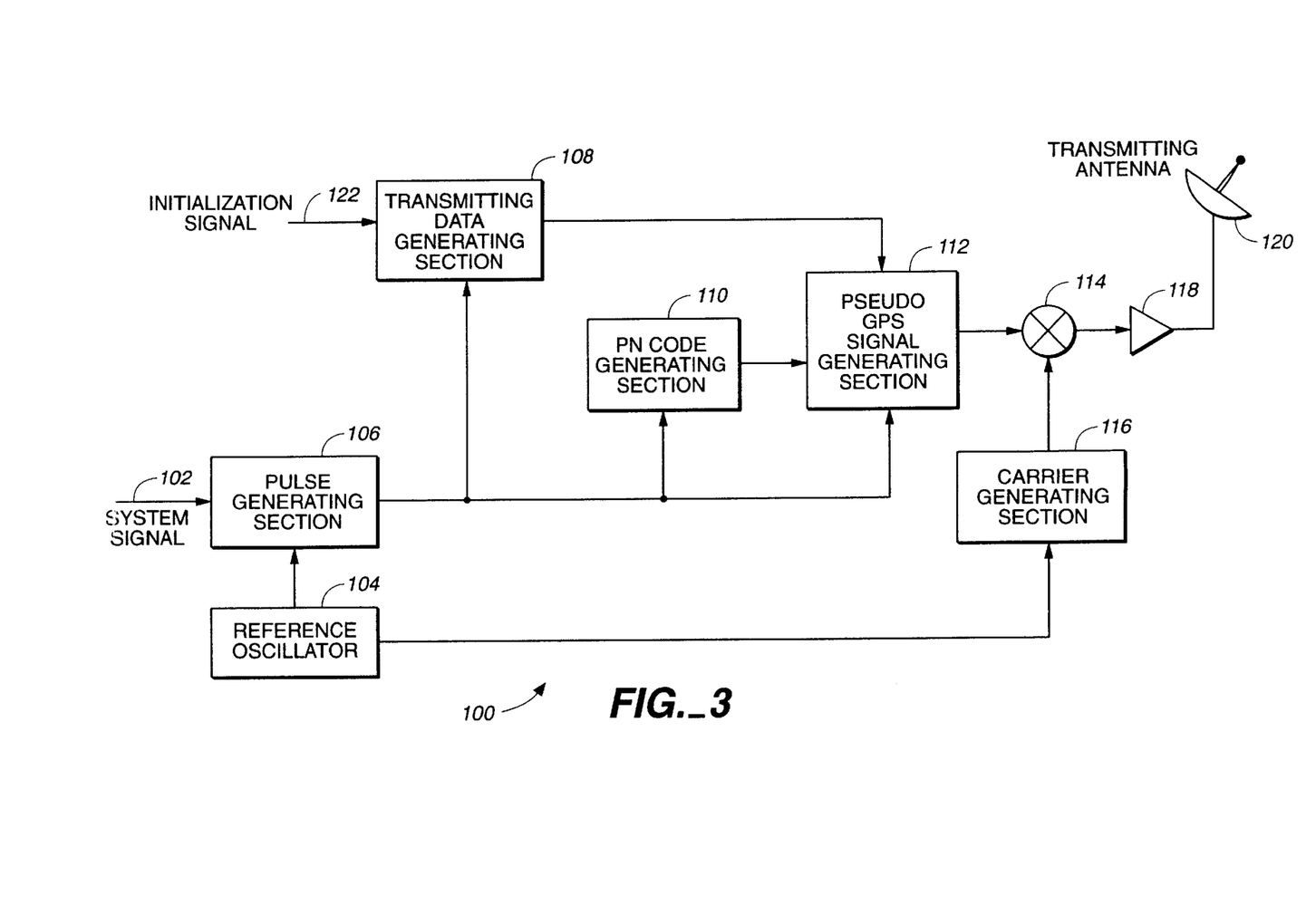
FIG. 3 shows a ground transmitter (GT) comprising a pseudolite.

In the preferred embodiment, the ground transmitter $GT_i$ can be implemented using a pseudolite (100) depicted in FIG. 3. As shown in FIG. 3, the pseudolite $GT_i$ generates and transmits the pseudo-GPS signals. In the simplest approach, ground transmitter-pseudolite $GT_i$ transmits on L-band (i.e., GT-band is the GPS signal band, for instance L2 frequency) and modulates that signal with its own unique PRN code (112). This code can provide anti-jamming capability and also serve as an identification of a particular (i) $GT_i$ as a source of the signal. The $L(GT_i)$ signal can be modulated with the data that allows a user to determine the precise coordinates of the $GT_i$ location. The precise location can be omitted from the $GT_i$ output data if the user is capable of looking up that information based on the $GT_i$ (ID) number (PRN code can be used as an ($ID_i$) number).

In general, the use of a single base station may be insufficient to receive the $L(GT_i)$ signals from all ground transmitters $GT_i$. This is the case of a limited $GT_i$—visibility. In the case of the limited $GT_i$—visibility, the preferred embodiment includes a plurality of the base stations sufficient to receive the $L(GT_i)$ signals from each $GT_i$. The case of the limited $GT_i$—visibility also constitutes the subject-matter of the present invention.

The following discussion is limited to the case of a full $GT_i$—visibility. The following discussion is focused on the determination of the minimum structure including the minimum number K of the SATPS satellites, the minimum number N of ground transmitters $GT_i$, and a single base station necessary to solve for the three-dimensional position of the receiver and to calibrate its internal time reference. A similar discussion can be focused on the measurements of the range-rate and doppler necessary to determine velocity of the user.

The following equations to determine the minimum structure will be written only for pseudo-ranges. The similar system of equations can be written for the carrier phase measurements. This carrier phase system of equations yields the same result for the minimum structure if the carrier phase ambiguities can be resolved without additional measurements.

The pseudo-range signal $PR_{USER}(SATPS_j)$ received by the user (30 of FIG. 1) from each of a j-number of visible satellites $SATPS_j$ can be expressed as:

$$PR_{USER}(SATPS_j) = R_{USER}(SATPS_j) + \Delta R(SATPS_j) + CB_{SATPSj} + CB_{USER} + \text{(noise)} + \text{(multipath)}; \quad (1)$$

where $$R_{USER}(SATPS_j) = \sqrt{((X_{USER} - X_{SATPSj})^2 + (Y_{USER} - Y_{SATPSj})^2 + (Z_{USER} - Z_{SATPSj})^2)} \quad (2)$$

represents the "nominal" range from the user to the satellite $SATPS_j$, wherein $X_{USER}$, $Y_{USER}$, and $Z_{USER}$ are the unknown user's coordinates, and wherein the three coordinates ($X_{SATPSj}$, $Y_{SATPSj}$ and $Z_{SATPSj}$) of each satellite $SATPS_j$ are known up to one unknown variable $\Delta R(SATPS_j)$;

$CB_{SATPSj}$ represents a known clock bias associated with the satellite's $SATPS_j$ precise clock; and $CB_{USER}$ is an unknown clock bias associated with the user's imprecise clock.

In the preferred embodiment, the user's clock bias $CB_{USER}$ is an unknown variable because the user's clock is imprecise. On the other hand, the satellite clock biases $CB_{SATPSj}$ are known variables, because the satellites employ the precise atomic clocks with very small biases that are controlled periodically by synchronization with the Ground Control Station.

Thus, we have a j-number of equations with 3 unknown user's coordinates $X_{USER}$, $Y_{USER}$, and $Z_{USER}$, with one unknown user's clock bias $CB_{USER}$, and with a j-number of unknown variables $\Delta R(SATPS_j)$.

The pseudo-range signal $PR_{USER}(GT_i)$ received by the user 30 from each of the N-number of ground transmitters $GT_i$ can be expressed as:

$$PR_{USER}(GT_i) = R_{USER}(GT_i) + CB_{GTi} + CB_{USER} + \text{(noise)} + \text{(multipath)}; \quad (3)$$

where $$R_{USER}(GT_i) = \sqrt{((X_{USER} - X_{GTi})^2 + (Y_{USER} - Y_{GTi})^2 + (Z_{USER} - Z_{GTi})^2)}; \quad (4)$$

represents the "nominal" range from the user to the ground transmitter $GT_i$, wherein $X_{USER}$, $Y_{USER}$, and $Z_{USER}$ are the unknown user's coordinates, and wherein the three coordinates ($X_{GTi}$, $Y_{GTi}$, $Z_{GTi}$) of each ground transmitter $GT_i$ are precisely known;

$CB_{USER}$ is an unknown clock bias associated with the user's imprecise clock; and $CB_{GTi}$ are the unknown clock biases of the imprecise clocks of the ground transmitters.

The equation (3) can be written for each of the N-number of ground transmitters.

The pseudo-range signal $PR_{BASE}(SATPS_j)$ received by the base station BS (12) from each of a j-number of visible satellites $SATPS_j$ can be expressed as:

$$PR_{BASE}(SATPS_j) = R_{BASE}(SATPS_j) + CB_{SATPSj} + CB_{BASE} + \Delta R(SATPS_j) + \text{(noise)} + \text{(multipath)}; \quad (5)$$

where $$R_{BASE}(SATPS_j) = \sqrt{((X_{BASE} - X_{SATPSj})^2 + (Y_{BASE} - Y_{SATPSj})^2 + (Z_{BASE} - Z_{SATPSj})^2)}; \quad (6)$$

represents the "nominal" range from the base station to the satellite $SATPS_j$, wherein $X_{BASE}$, $Y_{BASE}$, and $Z_{BASE}$ are precisely known base station's coordinates, and wherein the three coordinates ($X_{SATPSj}$, $Y_{SATPSj}$, $Z_{SATPSj}$) of each satellite $SATPS_j$ are known up to one unknown variable $\Delta R(SATPS_j)$;

$CB_{SATPSj}$ represents a known clock bias associated with the satellite's $SATPS_j$ precise clock; and $CB_{BASE}$ is an unknown clock bias associated with the base station's imprecise clock.

The equation (5) can be written for each of the (j) visible satellites $SATPS_j$. Thus, we have a j-number of equations for one additional unknown base station's clock bias $CB_{BASE}$.

Finally, the pseudo-range signal $PR_{BASE}(GT_i)$ received by the base station 12 from each of the N-number of ground transmitters $GT_i$ can be expressed as:

$$PR_{BASE}(GT_i) = R_{BASE}(GT_i) + CB_{GTi} + CB_{BASE} + \text{(noise)} + \text{(multipath)}; \quad (7)$$

where $$R_{BASE}(GT_i) = \sqrt{((X_{BASE} - X_{GTi})^2 + (Y_{BASE} - Y_{GTi})^2 + (Z_{BASE} - Z_{GTi})^2)}; \quad (8)$$

represents the "nominal" range from the base station to the ground transmitter $GT_i$, wherein $X_{BASE}$, $Y_{BASE}$, and $Z_{BASE}$ are the precisely known base station's coordinates, and wherein the three coordinates ($X_{GTi}$, $Y_{GTi}$, $Z_{GTi}$) of each ground transmitter $GT_i$ are precisely known;

$CB_{BASE}$ is an unknown clock bias associated with the base station's imprecise clock; and $CB_{GTi}$ are the unknown clock biases of the imprecise clocks of the ground transmitters.

The equation (7) can be written for each of the N-number of ground transmitters.

In the relative or differential mode, the pseudo-range and carrier phase measurements are differenced to get rid of the common mode errors. For instance, if we difference pseudo-range measurements from user to $SATPS_j$ and from the base to $SATPS_j$ (Eq's 1 and 5), then the satellite clock bias error ($CB_{SATPSj}$) cancels out, and error in the j-satellite position $\Delta R(SATPS_j)$ cancels out. The single-differenced measurement then becomes:

$$PR_{USER,\ BASE}(SATPS_j) = R_{USER}(SATPS_j) - R_{BASE}(SATPS_j) + CB_{USER} - CB_{BASE} + (\text{noise}) + (\text{multipath}); \qquad (9)$$

wherein the user clock bias error is now relative to the base clock bias error ($CB_{USER} - CB_{BASE}$). The single-differenced equation (9) still includes the range from user to $SATPS_j$ with its three unknowns $(X, Y, Z)_{USER}$. The user receiver in the differential mode, described by Eq. 9 above, does not solve for the absolute clock bias error at the base ($CB_{BASE}$), but for the relative clock bias error ($CB_{USER} - CB_{BASE}$). Thus, we need only four measurements for four unknowns $(X, Y, Z)_{USER}$ and ($CB_{USER} - CB_{BASE}$).

In the carrier phase relative positioning systems (such as OTF RTK Total Station), a double difference measurement is used to solve for the unknown user coordinates via a baseline computation (from base to user). The single-differenced measurement of Eq.9 is differenced with another single-differenced measurement (computed between user, base, and another $SATPS_k$, wherein the clock error is again a relative clock between user and base), to produce a double-differenced measurement which is totally independent of any clock errors. Double-differenced measurements contain only three unknowns $(X, Y, Z)_{USER}$. It takes four measurements to derive three independent double-differenced measurements. Thus, we need four carrier phase measurements to solve for three spatial unknowns ($\Delta X, \Delta Y, \Delta Z$).

Thus, equations (1)–(9) allow one to determine the minimum structure of the system (A), which is how many ground transmitters are needed for the differential navigation of the autonomous vehicle with the user if the user has the limited visibility of the sky. The visibility is defined as the number of satellites that the user can use for measurement purposes.

(1) The visibility of the sky is 0, that is, the user cannot see or track any satellite. If this is the case, the minimum number of ground transmitters needed for the differential navigation is equal to 4. Thus, the first combination is:

0 SATPS+4 GT.

(2) The visibility of the sky is 1, that is, the user can track only one satellite. If this is the case, the minimum number of ground transmitters needed for the differential navigation is equal to 3. Thus, the second combination is:

1 SATPS+3 GT.

(3) The visibility is 2. The minimum structure is:

2 SATPS+2 GT.

(4) The visibility is 3. The minimum structure is:

3 SATPS+1 GT.

(5) The visibility is 4. The minimum structure is:

4 SATPS+0 GT.

The velocity of the user can be determined by solving the system of equations similar to the system of equations (1)–(9) for the range-rate measurements.

Figure 2:
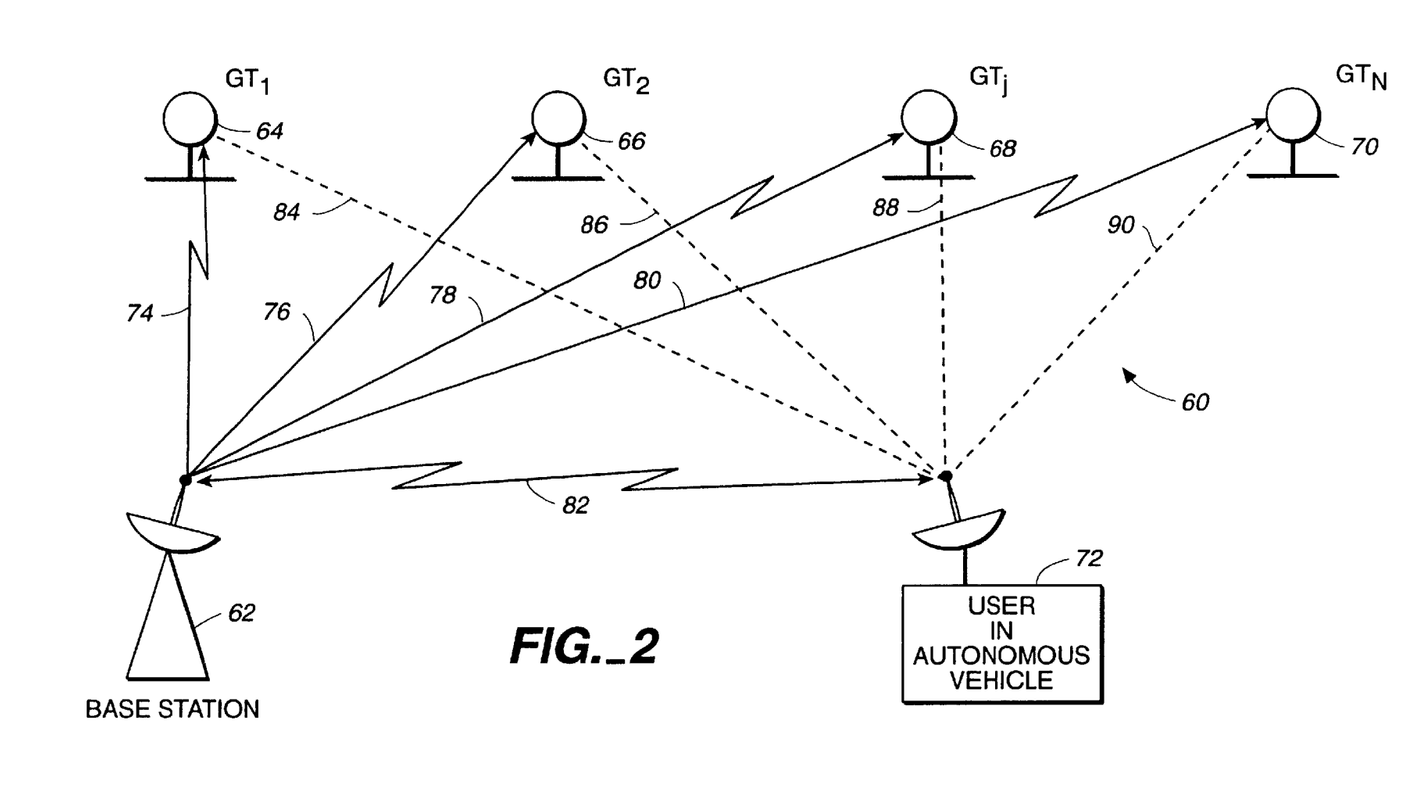
FIG. 2 depicts a system (B) comprising N-number of ground transmitters (GT$_i$), and a base station (BS).

The preferred embodiment of the present invention also includes a system (B) depicted in FIG. 2, which illustrates the system (B) (100) comprising an N-number of ground transmitters ($GT_j$) (64, 66, 68, 70), a base station (BS) (62), a 2N number of GTCL communication links between each $GT_i$ and base station (74, 76, 78, 80) and between each ground transmitter $GT_i$ and the user (84, 86, 88, 90), and a communication link CLB (82) between the base station and the user's receiver placed in an autonomous vehicle (72). The system (B) is the system (A) (10 of FIG. 1) without satellites. Therefore, the discussion given above and related to the system (A) is fully applicable to the system (B). Thus, the minimum structure for the system (B) is the first minimum structure of the system (A), that is

0 SATPS+4 GT.

The system (B) can be also solved for the so called time-transfer embodiment, wherein we are interested only in the timing coordinate at the user's location (we do not care about the user's coordinates). If this is a case, the minimum structure is:

0 SATPS+1 GT.

The preferred embodiment of the present invention also includes a method employing the system (A) for accurate determination of the terrestrial position, timing coordinate, and velocity of an autonomous vehicle in real-time by transmitting signals from a well-known location.

The method comprises the following steps. At first, we have to provide a K-number of $SATPS_j$ satellites in order to generate the satellite signals $L(SATPS_j)$ for providing ranging, timing, and velocity information at the user's location. Next, we provide an N-number of ground transmitters for generating ground transmitter $L(GT_i)$ signals for providing ranging, timing, and velocity information at the user's location. We also provide a base station (BS) for receiving the $L(SATPS_j)$ signals from each $SATPS_j$ satellite, for receiving the $L(GT_i)$ signals from each $GT_i$, for calculating the differential correction data signal $L(BS)$, and for transmitting the differential correction data signal $L(BS)$ to the user's location.

In the following steps, the user receives the satellite $L(SATPS_j)$ signals from each satellite $SATPS_j$, the $L(GT_i)$ signals from each $GT_i$, the differential correction data signal $L(BS)$ from the base station, and accurately determines its terrestrial position, timing coordinate, and velocity.

The method employing the system (A) can further include a step of providing a synchronization signal to each said $GT_i$ in order to synchronize clocks for all ground transmitters. This synchronization step can be performed by transmitting the synchronization signal from the base station. The method employing the system (A) can additionally include a step of initialization of each $GT_i$, that is, to provide the initial precise location coordinates for each ground transmitter.

The present embodiment also includes the method employing the system (B) for accurate determination of the terrestrial position, timing coordinate, and velocity of an autonomous vehicle in real-time by transmitting signals from well-known locations. This method is similar to the method employing the system (A), but does not include the steps related to the satellites SATPS.

The description of the preferred embodiment of this invention is given for the purposes of explaining the principles thereof, and is not to be considered as limiting or restricting the invention since many modifications may be made by the exercise of skill in the art without departing from the scope of the invention.

What is claimed is:

1. A system for determining a position of an object, said system receiving position signals from a plurality of position units at known locations, each said position unit having a clock with a known clock bias and a known clock drift, said system comprising:

a plurality of ground transmitters, each of said plurality of ground transmitters being configured to generate ground transmitter position signals that provide position information to the object, each of said plurality of ground transmitters including a clock with an unknown clock bias and an unknown clock drift, and each of said plurality of ground transmitters having a known position; and a base station configured to receive said position signals from each said position units, said base station being further configured to receive said ground transmitter position signals from each of said plurality of ground transmitters, said base station having an unknown clock bias, an unknown clock drift, and a known position, and said base station being further configured to calculate a differential correction data signal based on said position signals and said ground transmitter position signals and to transmit the differential correction data signal to said object; and wherein said object receives the position signals from each of said plurality of positioning units, the ground transmitter position signals from each of said ground transmitters, and the differential correction data signal from said base station, said object calculating its position based on said received signals.

2. The system of claim 1, wherein the position of the object includes a terrestrial position of the object.

3. The system of claim 1, wherein the position of the object includes velocity information of the object.

4. The system of claim 1, wherein said object further calculates a time of the position observation.

5. The system of claim 1, wherein the plurality of position units is a plurality of satellites.

6. The system of claim 5, wherein said plurality of satellites includes a K-number of SATPSj satellites, K being an integer and j being an integer less than or equal to K, for generating said position signals and wherein said plurality of ground transmitters includes an N-number of ground transmitters, where N is an integer, for generating the ground transmitter position signals.

7. The system of claim 6, wherein:

said K-number of SATPSj satellites comprises at least one satellite;

said N-number of ground transmitters comprises at least three ground transmitters;

said object utilizes the position signals generated by each said satellite;

said object employs the ground transmitter position signals generated by each said ground transmitter; and said object uses the differential correction data signal generated by said base station in order to determine said object's position.

8. A system for determining a position of an object, comprising:

a plurality of ground transmitters, each of said ground transmitters being configured to generate position signals that provide position information to the object, each of said ground transmitters including a clock with an unknown clock bias and an unknown clock drift, and each of said ground transmitters having a known position;

a base station configured to receive said position signals from each of said plurality of ground transmitters, said base station having an unknown clock bias, an unknown clock drift, and a known position, said base station being configured to calculate a differential correction data signal based on said position signals, and said base station being configured to transmit the differential correction data signal to said object; and said object receiving the ground transmitter position signals from each of said ground transmitters and the differential correction data signal from said base station, and said object calculating its position based on said received signals.

9. The system of claim 8, wherein the position of the object includes a terrestrial position of the object.

10. The system of claim 8, wherein the position of the object includes velocity information of the object.

11. The system of claim 8, wherein said object further calculates a time of the position observation.

12. The system of claim 8, wherein said plurality of ground transmitters comprises at least four ground transmitters, and wherein said object utilizes the position signals generated by each said ground transmitter and the differential correction data signal generated by said base station to determine said object's terrestrial position.

13. The system of claim 8, wherein said plurality of ground transmitters comprises at least one ground transmitter, and wherein said object utilizes the position signals generated by said ground transmitter and the differential correction data signal generated by said base station to determine a time of the position observation.

14. A method comprising:

a base station calculating a differential correction data signal based upon received position signals from at least one of a plurality of position units and ground transmitter position signals from at least one of a plurality of ground transmitters, said position signals being modulated by a predetermined code;

said base station transmitting the differential correction data signal to an object's location;

said object receiving the position signals from said at least one position unit;

said object receiving the ground transmitter position signals from said at least one ground transmitter;

said object receiving the differential correction data signal from said base station; and said object determining a position of said object.

15. The method of claim 14, wherein the position determined for said object is a terrestrial position of said object.

16. The method of claim 14, wherein determining a position of said object includes determining an instantaneous velocity of said object.

17. The method of claim 14, wherein in determining a position of said object, said object further determines the time of the position determination.

18. The method of claim 14, further comprising providing a synchronization signal to each said ground transmitter.

19. The method of claim 14, further comprising initializing each said ground transmitter, said initializing comprising providing location information for each said ground transmitter.

20. A method comprising:

generating position signals from at least one of a plurality of ground transmitters for providing position information at an object's location, said position signals being modulated by a predetermined code;

receiving, by a base station, the position signals from said at least one ground transmitter;

said base station calculating a differential correction data signal by said base station;

said base station transmitting the differential correction data signal to said object;

said object receiving the position signals from said at least one ground transmitter;

said object receiving the differential correction data signal from said base station; and said object determining a position of said object.

21. The method of claim 20, wherein the position determined for the object is a terrestrial position of said object.

22. The method of claim 20, wherein determining a position of said object includes determining an instantaneous velocity of said object.

23. The method of claim 20, wherein in determining a position of the object, said object further determines the time of the position determination.

24. The method of claim 20, further including providing a synchronization signal to said at least one ground transmitter.

25. The method of claim 20, further including initializing each said ground transmitter, said initializing including providing location information for said at least one ground transmitter.

26. A method comprising:

receiving a first position signal from an orbiting satellite;

receiving a second position signal from a ground transmitter;

computing a differential correction signal corresponding to the first position signal and the second position signal;

transmitting the differential correction signal to an object; and determining a position of said object.

27. A device for assisting in the determination of a position of an object, said device being configured to receive position signals from at least one position unit having a known location, each position unit having a clock with a known clock bias and a known clock drift; said device being further configured to receive ground transmitter position signals from at least one ground transmitter, each ground transmitter having a known position, a clock with an unknown clock bias, and unknown clock drift and a known position; and said device being further configured to calculate a differential correction data signal based on the position signals and ground transmitter position signals and transmit the differential correction data signal to the object.

* * * * *